US012695182B2

(12) United States Patent
Mei et al.

(10) Patent No.: US 12,695,182 B2
(45) Date of Patent: Jul. 28, 2026

(54) RADIO FREQUENCY DEVICE AND BASE STATION ANTENNA

(71) Applicant: Outdoor Wireless Networks LLC, Claremont, NC (US)

(72) Inventors: Xia Mei, Suzhou (CN); Long Shan, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 156 days.

(21) Appl. No.: 18/761,584

(22) Filed: Jul. 2, 2024

(65) Prior Publication Data

US 2025/0030157 A1 Jan. 23, 2025

(30) Foreign Application Priority Data

Jul. 17, 2023 (CN) ........................ 202310876728.X

(51) Int. Cl.
*H01Q 1/52* (2006.01)
*H01Q 1/24* (2006.01)
*H01Q 5/50* (2015.01)

(52) U.S. Cl.
CPC ............... *H01Q 1/52* (2013.01); *H01Q 1/246* (2013.01); *H01Q 5/50* (2015.01)

(58) Field of Classification Search
CPC ............. H01Q 1/52; H01Q 1/246; H01Q 5/50
See application file for complete search history.

(56) References Cited

U.S. PATENT DOCUMENTS

2013/0135168 A1* 5/2013 Kim ......................... H01Q 9/42 343/841
2014/0313089 A1* 10/2014 Wu ......................... H01Q 21/28 343/893
2016/0372809 A1* 12/2016 Liu ........................... H01P 1/18
2018/0226728 A1* 8/2018 Lee ......................... H01Q 1/243
2020/0021021 A1* 1/2020 Lin ......................... H01Q 5/307
2023/0344123 A1* 10/2023 Zhang ....................... H01Q 3/32
2025/0007173 A1* 1/2025 Chen ...................... H01Q 21/26

* cited by examiner

*Primary Examiner* — Hai V Tran
(74) *Attorney, Agent, or Firm* — Myers Bigel, P.A.

(57) ABSTRACT

A radio frequency device comprises: a substrate; a conductive circuit that is configured to transmit a signal and comprises a plurality of transmission line segments on the substrate; and a decoupling element on the substrate positioned between adjacent first and second transmission line segments, the decoupling element comprising a first arm adjacent to the first segment of transmission line, a second arm adjacent to the second segment of transmission line, and a connecting portion connecting the first and second arms. The decoupling element is configured to reduce coupling between the first and second transmission line segments.

19 Claims, 4 Drawing Sheets

RADIO FREQUENCY DEVICE AND BASE STATION ANTENNA

CROSS-REFERENCE TO RELATED APPLICATION

The present application claims priority to Chinese Patent Application No. 202310876728.X, filed Jul. 17, 2023, the entire content of which is incorporated herein by reference as if set forth fully herein.

FIELD

The present disclosure relates to the field of communication, in particular, to a radio frequency device and a base station antenna.

BACKGROUND

Cellular communications systems are well known in the art. In a cellular communications system, a geographic area is divided into a series of sections that are referred to as "cells" which are served by respective base stations. The base station may include one or more base station antennas that are configured to provide two-way radio frequency ("RF") communications with mobile subscribers that are within the cell served by the base station.

In order to accommodate the ever-increasing volumes of cellular communications, cellular operators have added cellular services in a variety of new frequency bands. In some cases, it is possible to use linear arrays of so-called "wide-band" or "ultra wide-band" radiating elements to provide service in multiple frequency bands. Therefore, for example, a radiating element operating within a frequency range of 1.7 to 2.7 GHz can be used to support cellular services in multiple different frequency bands. Base station antennas may also typically include multiple radiating element arrays, and these arrays are designed to operate in different frequency bands. For example, in a common multi-band antenna design, an antenna may have one or more linear arrays of "low-band" radiating elements configured to provide services in some or all of the 617-960 MHz bands, and one or more linear arrays of "mid-band" radiating elements configured to provide services in, for example, some or all of the 1427-2690 MHz bands.

In addition to the radiating element, the base station antenna includes a variety of radio frequency devices, such as phase shifters, filters, and power dividers. A phase shifter is a device that is capable of adjusting the phase of a radio signal. Phase shift may be introduced to a radio frequency signal by transmitting the radio frequency signal in a medium. The phase shifter is a device that uses this principle to change the phase of the radio frequency signal. Most modern multi-band antennas include a phase shifter to adjust the radiation pattern produced by each radiating element array, or the downtilt angle of an "antenna beam." Such downtilt angle adjustment may be used to adjust the coverage area of each radiating element array.

However, with the integration of more and more frequency bands and more and more functional modules (for example, phase shifters, filters, coaxial cables and radiating element arrays, etc.) in the base station antenna, the installation space and/or operation space (such as welding space) in the base station antenna is further restricted. This causes the design size of some radio frequency devices, for example, phase shifters or filters, to be subject to strict restrictions. A limited design size may result in smaller gaps between transmission lines within the radio frequency device, creating undesirable coupling interference between transmission lines that may negatively affect radio frequency performance of the radio frequency device.

SUMMARY

One aspect of the present disclosure relates to a radio frequency device, wherein the radio frequency device comprises: a substrate; a conductive circuit disposed on the substrate, the conductive circuit configured to transmit a signal and comprising a plurality of segments of transmission lines; and a decoupling element disposed on the substrate positioned between adjacent first and second segments of transmission lines, the decoupling element comprising a first arm adjacent to the first segment of transmission line, a second arm adjacent to the second segment of transmission line, and a connecting portion connecting the first and second arms, the decoupling element configured to at least partially reduce coupling between the first and second segments of transmission lines.

According to an embodiment of the present disclosure, by providing a decoupling element between two adjacent segments of transmission lines in a shorter distance in a conductive circuit of a circuit board of a radio frequency device, coupling between the two segments of transmission lines can be at least partially reduced, thereby improving radio frequency performance of the radio frequency device including the circuit board, e.g., reducing return loss and reducing insertion loss.

In some examples, the first arm of the decoupling element is generally parallel to the second arm.

In some examples, the first arm of the decoupling element is generally parallel to the first segment of transmission line and the second arm of the decoupling element is generally parallel to the second segment of transmission line.

In some examples, the first arm and the second arm of the decoupling element are substantially equal in length.

In some examples, the decoupling element is generally U-shaped.

In some examples, an operating frequency band of the radio frequency device comprises a first frequency band and the decoupling element has a length that is between one fifth and one third of a wavelength at a central frequency of the first frequency band.

In some examples, the length of the decoupling element is about a quarter of the wavelength at the central frequency of the first frequency band.

In some examples, the decoupling element is a first decoupling element, wherein the operating frequency band of the radio frequency device comprises a second frequency band different from the first frequency band, and wherein the radio frequency device comprises a second decoupling element whose length is between one fifth and one third of a wavelength at a central frequency of the second frequency band.

In some examples, the length of the second decoupling element is about a quarter of the wavelength at the central frequency of the second frequency band.

In some examples, a plurality of decoupling elements are arranged between the adjacent first and second segments of transmission lines, the plurality of decoupling elements arranged sequentially along a direction of space between the first and second segments of transmission lines, at least a first portion of the plurality of decoupling elements including the first decoupling element, and at least a second portion of the plurality of decoupling elements including the second decoupling element.

In some examples, the decoupling element is generally H-shaped or A-shaped.

In some examples, the decoupling element is a first decoupling element having a first shape, and wherein the radio frequency device comprises a second decoupling element having a second shape that is different from the first shape.

In some examples, the radio frequency device comprises a plurality of decoupling elements arranged sequentially along a direction of space between the first and second segments of transmission lines, the plurality of decoupling elements including the first and second decoupling elements.

In some examples, the decoupling element is a first decoupling element having a first shape and a first orientation, and wherein the radio frequency device comprises a second decoupling element having the first shape and a second orientation different from the first orientation.

In some examples, the radio frequency device comprises a plurality of decoupling elements arranged sequentially along a direction of space between the first and second segments of transmission lines, the plurality of decoupling elements including the first and second decoupling elements.

In some examples, a distance between the two adjacent segments of transmission lines is less than 10 mm. In other examples, a distance between the two adjacent segments of transmission lines is less than 4 mm. In some examples, at least one of the two adjacent segments of transmission lines is serpentinely coiled.

In some examples, the substrate comprises a first surface and a second surface opposite to the first surface, the conductive circuit comprises a first conductive circuit disposed on the first surface and a second conductive circuit disposed on the second surface, and the first conductive circuit is electrically connected to the second conductive circuit via a conductive structure.

In some examples, the first conductive circuit is symmetrical with the second conductive circuit relative to the substrate.

In some examples, the radio frequency device is configured as a phase shifter, a filter, a power divider, a duplexer, a feeder panel, or a combiner.

In some examples, the radio frequency device is configured as a cavity phase shifter.

In some examples, the cavity phase shifter is configured as a vertical feed cavity phase shifter.

Another aspect of the present disclosure relates to a radio frequency device, wherein the radio frequency device comprises: a substrate; a conductive circuit disposed on the substrate, the conductive circuit configured to transmit a signal and including multiple segments of transmission lines; and a decoupling element disposed between adjacent first and second segments of transmission lines of the conductive circuit, the decoupling element having a substantially U-shaped shape.

In some examples, the first arm of the decoupling element is generally parallel to the second arm.

In some examples, the first arm and the second arm of the decoupling element are substantially equal in length.

In some examples, an operating frequency band of the radio frequency device comprises a first frequency band and the decoupling element has a length that is about a quarter of a wavelength at a central frequency of the first frequency band.

In some examples, the decoupling element is a first decoupling element, wherein the operating frequency band of the radio frequency device comprises a second frequency band different from the first frequency band, and wherein the radio frequency device further comprises a second decoupling element whose length is about a quarter of a wavelength at a central frequency of the second frequency band.

In some examples, the decoupling element is a first decoupling element having a first orientation, and wherein the radio frequency device comprises a second decoupling element that has a second orientation that is different from the first orientation.

In some examples, a distance between the two adjacent segments of transmission lines is less than 4 mm.

In some examples, at least one of the transmission lines is serpentinely coiled.

In some examples, the substrate comprises a first surface and a second surface opposite to the first surface, the conductive circuit comprises a first conductive circuit disposed on the first surface and a second conductive circuit disposed on the second surface, and the first conductive circuit is electrically connected to the second conductive circuit via a conductive structure, wherein the first conductive circuit is symmetrical with the second conductive circuit relative to the substrate.

In some examples, the radio frequency device is configured as a cavity phase shifter.

Still another aspect of the present disclosure relates to a base station antenna, including: the radio frequency device as described above; and a radiating element array, where the radio frequency device is electrically connected to at least some radiating elements in the radiating element array.

The above-mentioned technical features, the technical features to be mentioned below and the technical features shown separately in the drawings may be arbitrarily combined with each other as long as the combined technical features are not contradictory. All feasible feature combinations are technical contents clearly recorded herein. Any one of a plurality of sub-features contained in the same sentence may be applied independently without necessarily being applied together with other sub-features.

Figure 1:
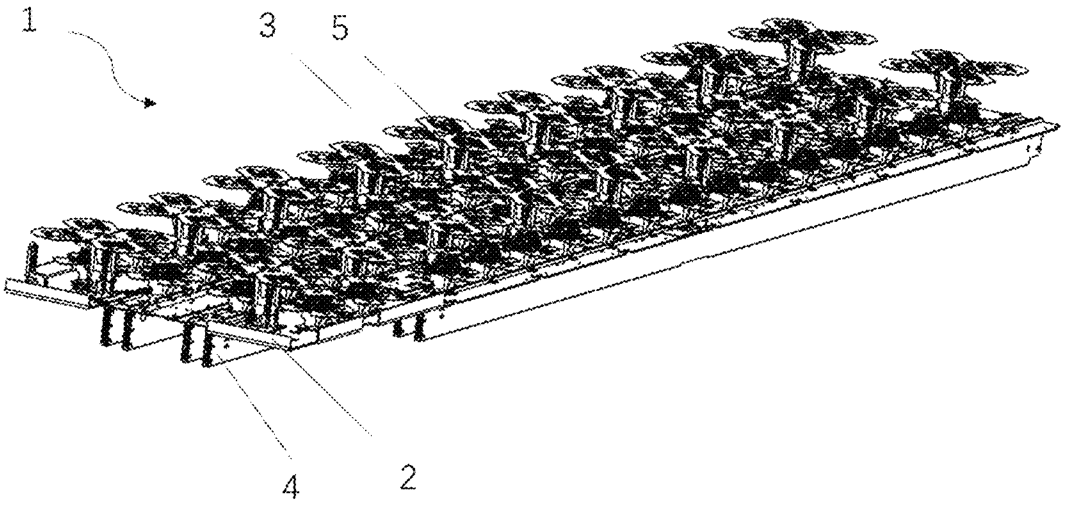
FIG. 1 is a schematic stereoscopic view of a portion of a base station antenna, showing a reflector, a radiating element array located in front of the reflector, and a cavity phase shifter located behind the reflector.

Note, in the examples described below, the same reference signs are sometimes jointly used between different attached drawings to denote the same parts or parts with the same functions, and repeated descriptions thereof are omitted. In this Specification, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the disclosed invention is not limited to the positions, dimensions, and ranges disclosed in the attached drawings and the like.

DETAILED DESCRIPTION

The present disclosure will be described below with reference to the attached drawings, wherein the attached drawings illustrate certain examples of the present disclosure. However, it should be understood that the present disclosure may be presented in many different ways and is not limited to the examples described below; in fact, the examples described below are intended to make the disclosure of the present disclosure more complete and to fully explain the protection scope of the present disclosure to those of ordinary skill in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high", and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other positions), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or examples.

As used herein, the word "basically" means including any minor changes caused by design or manufacturing defects, device or component tolerances, environmental influences, and/or other factors.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

The present disclosure provides a radio frequency device, including a substrate, a conductive circuit disposed on the substrate, and at least one decoupling element disposed on the substrate. The conductive circuit is configured to transmit a signal and can include multiple segments of transmission lines. Each decoupling element is positioned between two adjacent segments of transmission lines and includes a first arm, a second arm, and a connecting portion connecting the first arm and the second arm. Each decoupling element may be configured to at least partially reduce coupling between the two segments of transmission lines, thereby improving radio frequency performance of the radio frequency device, e.g., reducing return loss and reducing insertion loss.

It should be understood that the radio frequency device mentioned in the present disclosure may be a variety of functional devices applied in base station antennas, and is not limited to the type of devices described in specific examples. In some examples, the radio frequency device may be a phase shifter or a power divider. In other examples, the radio frequency device may be a filter, a duplexer, a feeder panel, or a combiner. The radio frequency device according to the present disclosure may be electrically connected to at least some radiating elements in a radiating element array in the base station antenna.

Next, the radio frequency device according to some embodiments of the present disclosure is described in detail with a cavity phase shifter as an example.

FIG. 1 is a schematic view of a portion of a base station antenna 1, showing a reflector 2, a radiating element array 3 located in front of the reflector 2, and a cavity phase shifter 4 located behind the reflector 2. As shown in FIG. 1, multiple radiating elements 5 are mounted to extend forwardly from the reflector 2 of the base station antenna 1 to form the radiating element array 3. The radio frequency device configured as the cavity phase shifter 4 may be disposed to receive one or more radio frequency signals from a radio device (not shown), perform a phase shift operation on various sub-components of a corresponding radio frequency signal, and feed the phase-shifted one or more radio frequency signals to at least some radiating elements 5 of the radiating element array 3 electrically connected to an output port of the cavity phase shifter 4. The various radiating elements 5 may be fed by a feeder panel disposed on the reflector 2 and are configured to send and receive signals in corresponding operating frequency bands.

Figure 2:
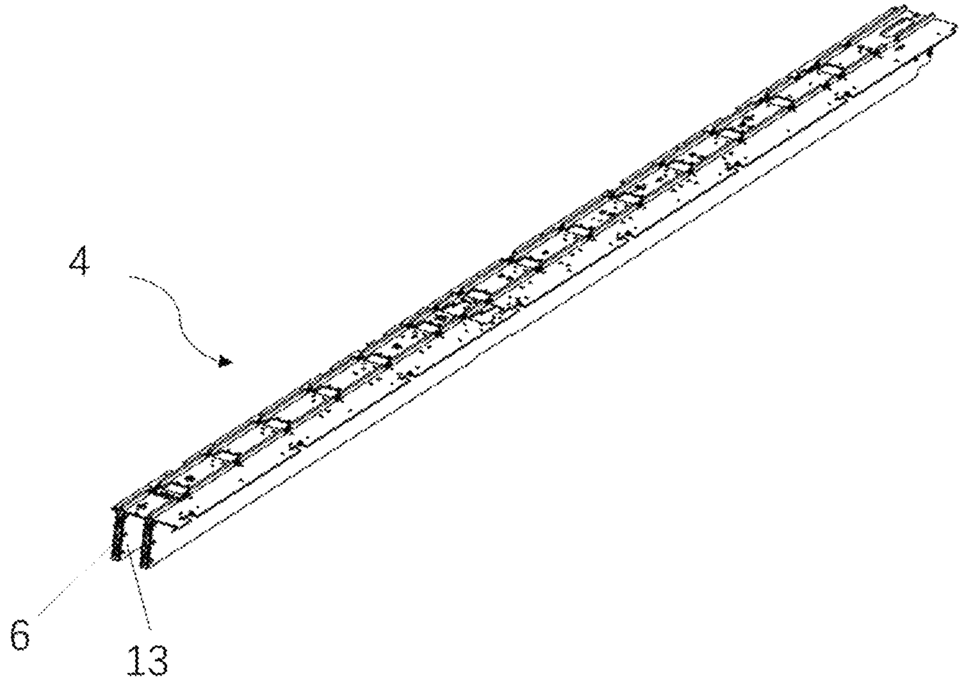
FIG. 2 is a schematic stereoscopic view of the cavity phase shifter of FIG. 1.

FIG. 2 is a schematic stereoscopic view of the cavity phase shifter 4 of FIG. 1. The cavity phase shifter 4 as shown in FIG. 2 includes a metal cavity 13 and a circuit board 6 housed within the metal cavity 13, and the circuit board 6 includes a substrate and a conductive circuit or a phase shift circuit printed on the substrate. Typically, the metal cavity 13 of the cavity phase shifter 4 may be grounded, so the conductive circuit on the circuit board 6 may form a strip line circuit. Further, it will be appreciated by one skilled in the art that the cavity phase shifter 4 further includes a sliding dielectric block housed within the metal cavity 13. By causing the sliding dielectric block to slide relative to the conductive circuit on the circuit board 6, the length of the conductive circuit covered by the sliding dielectric block can be changed, thereby changing the phase of the signal (e.g., the radio frequency signal) transmitted in the conductive circuit. In the cavity phase shifter 4, the substrate of the circuit board 6 may include a first surface and a second surface opposite to the first surface, and the conductive circuit of the circuit board 6 may be disposed on at least one surface of the substrate. In some examples, the conductive circuit of the circuit board 6 may include a first conductive circuit disposed on the first surface and a second conductive circuit disposed on the second surface, where the first conductive circuit may be electrically connected to the second conductive circuit via a conductive structure, such as an electroplated through hole. Advantageously, the first and second conductive circuits may be substantially symmetrical relative to the substrate. That is, the first and second conductive circuits may be disposed substantially coincident with one another on opposing surfaces of the substrate when viewed from the thickness direction of the circuit board 6. The construction of the cavity phase shifter 4 is known to those skilled in the art, and therefore, the cavity phase shifter 4 is not specifically illustrated and described in the present disclosure. It will be understood that in other embodiments not shown, the cavity phase shifter 4 may also be replaced by other forms of phase shifter, such as a sliding phase shifter or a trombone type phase shifter.

As various radiating element arrays in the base station antenna 1 and various radio frequency devices become increasingly integrated, conductive circuits on the circuit board in the radio frequency device are becoming more dense, resulting in a very narrow spacing between many adjacent transmission lines of the conductive circuit. In the illustrated example, multiple cavity phase shifters 4 are mounted at a distance from each other to the rear side of the reflector 2. The circuit boards 6 in the various cavity phase shifters 4 may be disposed substantially perpendicular to the reflector 2, thereby forming vertical feed cavity phase shifters 4. Subject to the design space in the base station antenna 1, such a cavity phase shifter 4 is generally constructed to have an elongated profile, i.e., the transverse dimension of the cavity phase shifter 4 perpendicular to the reflector 2 is much smaller than its longitudinal dimension parallel to the reflector 2 and extending along the longitudinal direction of the base station antenna 1. The interior dimensions of such cavity phase shifter 4 are particularly compact, resulting in particularly limited placement space for the conductive circuits on the circuit board 6 therein. For example, the distance between two adjacent segments of transmission lines at some locations of the circuit board 6 in the cavity phase shifter 4 is less than 10 mm, 6 mm, or even less than 4 mm. The arrangement of such a compact conductive circuit can result in undesirable electromagnetic coupling between adjacent transmission lines. Electromagnetic coupling may also be referred to as mutual inductance coupling. When two segments of transmission lines are closer, there may be mutual inductance between the two segments of transmission lines, so that a current change in each segment of transmission line may affect the other transmission line by mutual inductance, resulting in an energy transfer between the two segments of transmission lines. Such electromagnetic coupling can cause undesirable conditions such as increased return loss and insertion loss, and deformation of gain distribution.

Figure 3:
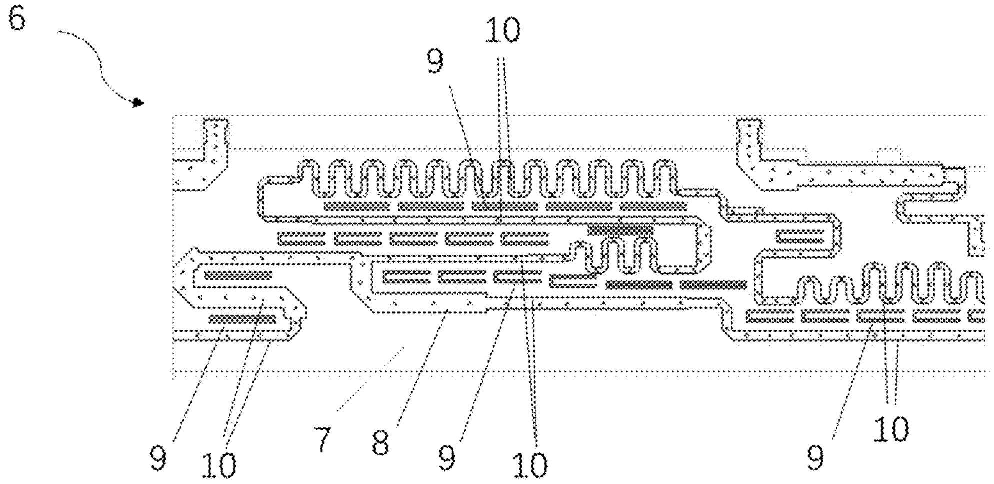
FIG. 3 is a schematic view of a portion of a circuit board in a cavity phase shifter according to some examples of the present disclosure with a decoupling element disposed on the circuit board.

FIG. 3 is a schematic view of a portion of the circuit board 6 in the cavity phase shifter 4 according to some examples of the present disclosure. As shown in FIG. 3, the circuit board 6 includes a substrate 7, a conductive circuit 8 disposed on the substrate 7, and one or more decoupling elements 9 disposed on the substrate 7, where each decoupling element 9 may be positioned between two adjacent segments of transmission lines 10 of the conductive circuit 8 and configured to at least partially reduce coupling between the two adjacent segments of transmission lines 10. It will be understood that not all decoupling elements and corresponding transmission lines therewith are marked in FIG. 3 for clarity of illustration. As shown in FIG. 3, any of the two adjacent segments of transmission lines 10 may be straight or serpentinely coiled. The decoupling element 9 may be disposed within a relatively narrow space between two adjacent segments of transmission lines 10, and the width of the narrow space, or alternatively, the spacing between two adjacent segments of transmission lines 10 may be less than 10 mm, less than 8 mm, less than 6 mm, or even less than 4 mm. In some examples, the decoupling element 9 may be arranged between, or may be arranged only between two adjacent segments of transmission lines 10, and the spacing between the two adjacent segments of transmission lines 10 may be less than a predetermined value, e.g., less than 10 mm, 8 mm, 6 mm, or even 4 mm. The decoupling element 9 may be made of a conductive material, such as metal copper or aluminum, for example, may be made of the same material as the conductive circuit 8 and/or the transmission lines 10 thereof.

As further shown in FIG. 3, multiple decoupling elements 9 may be printed within the corresponding narrow space between two adjacent segments of transmission lines 10, and the multiple decoupling elements may be arranged sequentially at a distance spaced along the direction of the narrow space. The distances spaced between every two decoupling elements 9 may be equal or different. The multiple decoupling elements 9 may be arranged throughout the entire corresponding narrow space, or may be arranged in a portion of the corresponding narrow space. In some examples, the shapes and/or orientations of multiple decoupling elements 9 arranged within one narrow space may be the same as one another or at least different in part. In some examples, the shapes and/or orientations of decoupling elements 9 arranged within different narrow spaces may be the same as one another or at least different in part.

Figure 4:
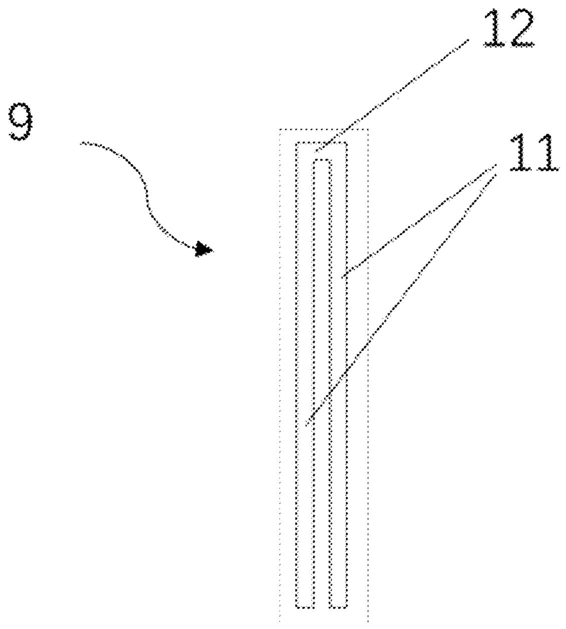
FIG. 4 is a schematic view of a decoupling element according to some examples of the present disclosure.

As shown in FIG. 4, in some embodiments, the decoupling element 9 may include at least two arms 11 (two arms in the figure) and a connecting portion 12 connecting the two arms 11. The decoupling element 9 so formed may be equivalent to a resonator such that electromagnetic energy from two adjacent segments of transmission lines 10 of both sides of the decoupling element 9 is able to oscillate therein to inhibit near field radiation. In other words, the decoupling element 9 may be considered as a wall of separation or a separator between two adjacent segments of transmission lines 10. The decoupling element 9 may reduce electromagnetic coupling between two adjacent segments of transmission lines 10 on both sides of the decoupling element 9 by electromagnetic decoupling between each arm 11 and the transmission line 10 adjacent to the arm 11, thereby helping to reduce the coupling loss of signals transmitted in the conductive circuit 8.

Advantageously, the two arms 11 of the decoupling element 9 may be disposed substantially parallel to each other. Advantageously, the two arms 11 of the decoupling element 9 may be disposed substantially parallel to the respective transmission lines 10 adjacent to the two arms 11. Advantageously, where the transmission line 10 adjacent to the decoupling element 9 is not straight (e.g., the serpentine or meandered transmission line seen in FIG. 3), then the arm 11 of the decoupling element 9 adjacent to the transmission line 10 may be disposed substantially parallel to a major direction or longitudinal direction of the transmission line 10. Advantageously, the lengths of the two arms 11 of the decoupling element 9 may be substantially equal to each other, or may be different from one another.

Figure 5:
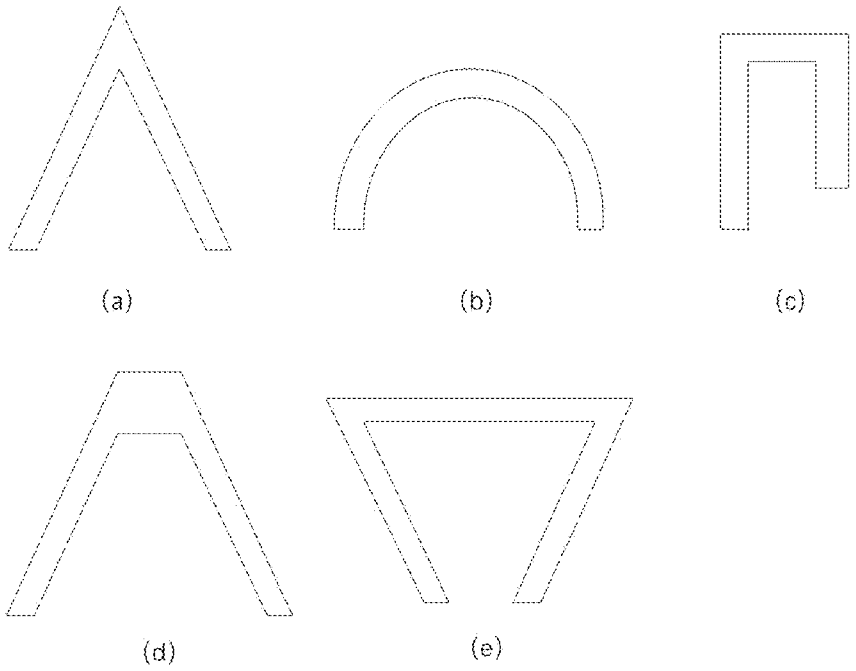
FIG. 5 is a schematic view of various decoupling elements according to some examples of the present disclosure.

The decoupling element 9 may be formed as approximately upper U-shaped. It will be understood that the "U" shape referred to herein should be broadly understood as having two arms with same or different lengths, with the two arms connected at end portions thereof. Thus, as seen in FIG. 5, which shows some example diagrams with the understanding that the present disclosure is not limited thereto, "U" shaped decoupling elements 9 may include decoupling elements that are or are similar to "V" shapes, "C" shapes, and "J" shapes. In some examples, the lengths and/or orientations of the two arms 11 of the U-shaped decoupling element 9 may be different. In some examples, the length of each decoupling element 9 may be associated with the central frequency of the operating frequency band of the cavity phase shifter 4. In some examples, the length of each decoupling element 9 may be between one fifth and one third of the wavelength at the central frequency described above, for example about one quarter of the wavelength at the central frequency. It should be understood that the "length" described above refers to the length of the free end of one arm 11 to pass through the connecting portion 12 to reach the free end of the other arm 11. In some embodiments, the cavity phase shifter 4 may include multiple different operating frequency bands, and the cavity phase shifter 4 may correspondingly include multiple decoupling elements 9 of different lengths. For example, the operating frequency band of the cavity phase shifter 4 may include a first frequency band and a second frequency band different from the first frequency band, and the cavity phase shifter 4 may include a first decoupling element and a second decoupling element, where the length of the first decoupling element is between one fifth and one third of the wavelength at the central frequency of the first frequency band, e.g., about one quarter of the wavelength at the central frequency; and the length of the second decoupling element is between one fifth and one third of the wavelength at the central frequency of the second frequency band, e.g., about one quarter of the wavelength at the central frequency. In some examples, multiple decoupling elements 9 may be printed within the corresponding narrow space between two adjacent segments of transmission lines 10, and the multiple decoupling elements may be arranged sequentially along the orientation of the narrow space. In some examples, at least a first portion of the multiple decoupling elements 9 is a first decoupling element designed for the first frequency band and at least a second portion is a second decoupling element designed for the first frequency band.

Figure 6:
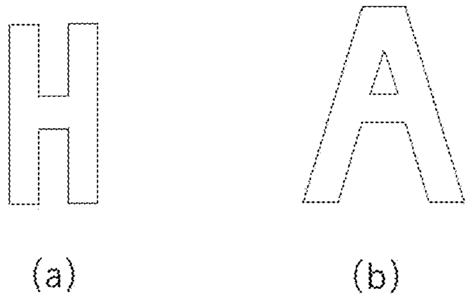
FIG. 6 is a schematic view of various decoupling elements according to some examples of the present disclosure.

It will be understood that the shape of the decoupling element 9 is not limited to be U-shaped, but may also be H-shaped, A-shaped, or the like, as shown in FIG. 6. It will be understood that the cavity phase shifter 4 may include multiple decoupling elements 9 having different shapes, and/or the cavity phase shifter 4 may include multiple decoupling elements 9 having the same shape but different orientations. In some examples, multiple decoupling elements 9 may be printed within the corresponding narrow space between two adjacent segments of transmission lines 10, and the multiple decoupling elements may be arranged sequentially along the orientation of the narrow space. In some examples, a first decoupling element of the multiple decoupling elements 9 is a decoupling element having a first shape, and a second decoupling element of the multiple decoupling elements 9 is a decoupling element having a second shape that is different from the first shape. In some examples, the multiple decoupling elements 9 include a group of decoupling elements having the same shape, where a first portion of the group of decoupling elements has a first orientation and a second portion of the group of decoupling elements has a second orientation.

It will be understood that the decoupling element 9 described above is not limited to the circuit board 6 applied to the cavity phase shifter 4, or may be a circuit board applied to other types of phase shifters, or may be a circuit board applied to other radio frequency devices (e.g., filters, power dividers, duplexers, feeder panels, or combiners) of the base station antenna 1.

Figure 7:
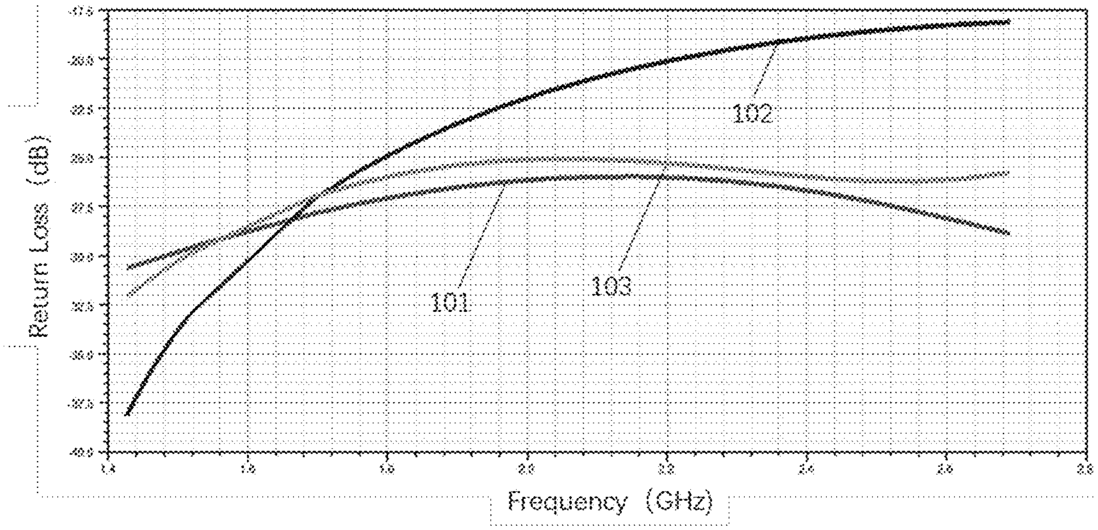
FIG. 7 is a first simulated test diagram of return loss of a conductive circuit of a circuit board of a cavity phase shifter.
Figure 8:
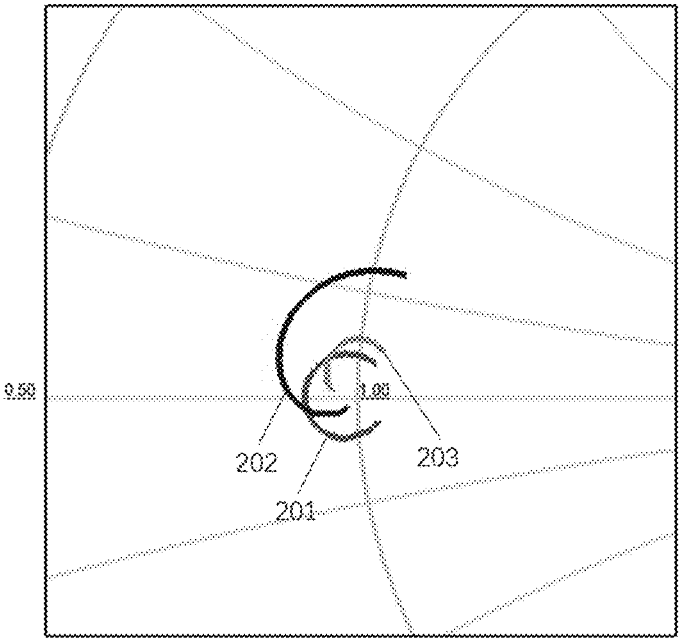
FIG. 8 is a second simulated test diagram (Smith chart) of return loss of a conductive circuit of a circuit board of a cavity phase shifter.

FIGS. 7 and 8 show simulated test diagrams of return loss of a conductive circuit of the circuit board 6 of the cavity phase shifter 4. A curve 101 in FIG. 7 and a curve 201 in FIG. 8 are return loss of a conductive circuit that includes two adjacent segments of transmission lines when the distance between the two adjacent segments of transmission lines is 12 mm and a decoupling element 9 is not included. A curve 102 in FIG. 7 and a curve 202 in FIG. 8 are return loss of a conductive circuit that includes two adjacent segments of transmission lines when the distance between the two adjacent segments of transmission lines is 4 mm and a decoupling element 9 is not included. A curve 103 in FIG. 7 and a curve 203 in FIG. 8 are return loss of a conductive circuit that includes two segments of transmission lines when the distance between the two adjacent segments of transmission lines is 4 mm, and a decoupling element 9 is disposed between the two segments of transmission lines. Thus, as the spacing between two adjacent segments of transmission lines decreases, there is a tendency for the return loss of a conductive circuit including both the segments of transmission lines to become larger, e.g., at higher frequencies. However, when a decoupling element 9 is disposed between two adjacent segments of transmission lines with a relatively small spacing, the return loss of the conductive circuit including the two segments of transmission lines can be reduced.

Figure 9:
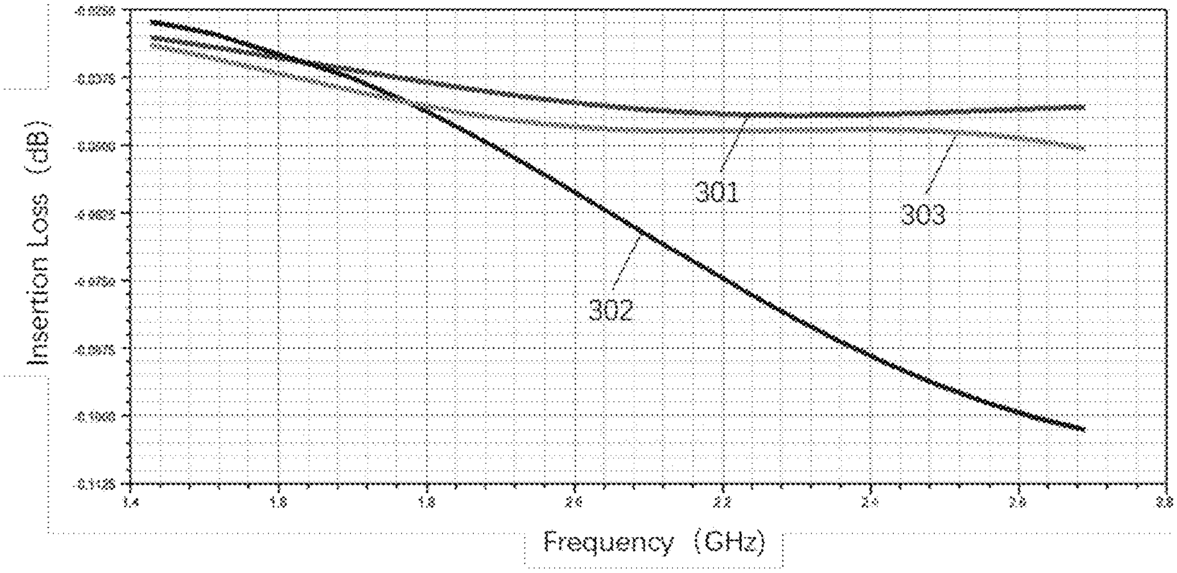
FIG. 9 is a simulated test diagram of insertion loss of a conductive circuit of a circuit board of a cavity phase shifter.

FIG. 9 is a simulated test diagram of insertion loss of a conductive circuit of the circuit board 6 of the cavity phase shifter 4. A curve 301 is insertion loss of a conductive circuit that includes two adjacent segments of transmission lines when the distance between the two adjacent segments of transmission lines is 12 mm and a decoupling element 9 is not included. A curve 302 is insertion loss of a conductive circuit that includes two adjacent segments of transmission lines when the distance between the two adjacent segments of transmission lines is 4 mm and a decoupling element 9 is not included. A curve 303 is insertion loss of a conductive circuit that includes two segments of transmission lines when the distance between the two adjacent segments of transmission lines is 4 mm, and a decoupling element 9 is disposed between the two segments of transmission lines. Thus, as the spacing between two adjacent segments of transmission lines decreases, there is a tendency for the insertion loss of a conductive circuit including both the segments of transmission lines to become larger, e.g., at higher frequencies. However, when a decoupling element 9 is disposed between two adjacent segments of transmission lines with a relatively small spacing, the insertion loss of the conductive circuit including the two segments of transmission lines can be reduced.

According to an embodiment of the present disclosure, by providing a decoupling element between two adjacent segments of transmission lines in a shorter distance in a conductive circuit of a circuit board of a radio frequency device, coupling between the two segments of transmission lines can be at least partially reduced, thereby improving radio frequency performance of the radio frequency device including the circuit board, e.g., reducing return loss and reducing insertion loss.

Although some specific examples of the present disclosure have been described in detail through examples, those skilled in the art should understand that the above examples are only for illustration rather than for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the attached claims.

That which is claimed is:

1. A radio frequency device, wherein the radio frequency device comprises:

a substrate;

a conductive circuit disposed on the substrate, the conductive circuit configured to transmit a signal and comprising a plurality of segments of transmission lines; and a decoupling element disposed on the substrate in a same plane as the conductive circuit and positioned between adjacent first and second segments of the plurality of segments of the transmission lines, the decoupling element comprising a first arm adjacent to the first segment of the plurality of segments of the transmission lines, a second arm adjacent to the second segment of the plurality of segments of the transmission lines, and a connecting portion connecting the first and second arms, the decoupling element configured to at least partially reduce coupling between the first and second segments of the plurality of segments of the transmission lines.

2. The radio frequency device according to claim 1, wherein the first arm of the decoupling element is generally parallel to the second arm.

3. The radio frequency device according to claim 1, wherein the first arm of the decoupling element is generally parallel to the first segment of the plurality of segments of the transmission lines and the second arm of the decoupling element is generally parallel to the second segment of the plurality of segments of the transmission lines.

4. The radio frequency device according to claim 1, wherein the decoupling element is generally U-shaped.

5. The radio frequency device according to claim 4, wherein the decoupling element has a length that is between one fifth and one third of a wavelength at a central frequency of an operating frequency band of the radio frequency device.

6. The radio frequency device according to claim 1, wherein the decoupling element is generally H-shaped or A-shaped.

7. The radio frequency device according to claim 1, wherein the decoupling element is a first decoupling element having a first shape, and wherein the radio frequency device comprises a second decoupling element having a second shape that is different from the first shape.

8. The radio frequency device according to claim 1, wherein the decoupling element is a first decoupling element having a first shape and a first orientation, and wherein the radio frequency device comprises a second decoupling element having the first shape and a second orientation different from the first orientation.

9. The radio frequency device according to claim 1, wherein a distance between two adjacent segments of the plurality of segments of the transmission lines is less than 10 mm.

10. The radio frequency device according to claim 1, wherein the substrate comprises a first surface and a second surface opposite to the first surface, the conductive circuit comprises a first conductive circuit disposed on the first surface and a second conductive circuit disposed on the second surface, and the first conductive circuit is electrically connected to the second conductive circuit via a conductive structure.

11. The radio frequency device according to claim 10, wherein the first conductive circuit is symmetrical with the second conductive circuit relative to the substrate.

12. The radio frequency device according claim 1, wherein the radio frequency device is configured as a phase shifter, a filter, a power divider, a duplexer, a feeder panel, or a combiner.

13. A radio frequency device, wherein the radio frequency device comprises:

a substrate;

a conductive circuit disposed on the substrate, the conductive circuit configured to transmit a signal and including multiple segments of transmission lines; and a decoupling element disposed in a same plane as the conductive circuit and between adjacent first and second segments of the multiple segments of the transmission lines of the conductive circuit, the decoupling element having a substantially U-shaped shape.

14. The radio frequency device according to claim 13, wherein a first arm and a second arm of the decoupling element are substantially equal in length.

15. The radio frequency device according to claim 13, wherein the decoupling element has a length that is about a quarter of a wavelength at a central frequency of an operating frequency band of the radio frequency device.

16. The radio frequency device according to claim 13, wherein the decoupling element is a first decoupling element having a first orientation, and wherein the radio frequency device comprises a second decoupling element that has a second orientation that is different from the first orientation.

17. The radio frequency device according to claim 13, wherein a distance between two adjacent segments of the multiple segments of the transmission lines is less than 4 mm.

18. The radio frequency device according to claim 13, wherein at least one of the multiple segments of the transmission lines is serpentinely coiled.

19. The radio frequency device according to claim 13, wherein the radio frequency device is configured as a cavity phase shifter.

* * * * *